US012695875B2

(12) United States Patent
Mohananchettiar et al.

(10) Patent No.: US 12,695,875 B2
(45) Date of Patent: Jul. 28, 2026

(54) MULTI-LEVEL LATENT FUSION IN NEURAL NETWORKS FOR IMAGE AND VIDEO CODING

(71) Applicant: Dolby Laboratories Licensing Corporation, San Francisco, CA (US)

(72) Inventors: Arunkumar Mohananchettiar, Bengaluru (IN); Jay Nitin Shingala, Bangalore (IN); Pankaj Sharma, Bengaluru (IN); Nijil Kolleri, Kozhikode (IN); Peng Yin, Ithaca, NY (US); Arjun Arora, Sunnyvale, CA (US); Fangjun Pu, Sunnyvale, CA (US); Taoran Lu, Santa Clara, CA (US); Sean Thomas Mccarthy, San Francisco, CA (US); Walter J. Husak, Simi Valley, CA (US)

(73) Assignee: Dolby Laboratories Licensing Corporation, San Francisco, CA (US)

( * ) Notice: Subject to any disclaimer, the term of this patent is extended or adjusted under 35 U.S.C. 154(b) by 43 days.

(21) Appl. No.: 18/685,319

(22) PCT Filed: Aug. 3, 2022

(86) PCT No.: PCT/US2022/039267
§ 371 (c)(1),
(2) Date: Feb. 21, 2024

(87) PCT Pub. No.: WO2023/027873
PCT Pub. Date: Mar. 2, 2023

(65) Prior Publication Data
US 2024/0357112 A1      Oct. 24, 2024

Related U.S. Application Data

(60) Provisional application No. 63/257,388, filed on Oct. 19, 2021.

(30) Foreign Application Priority Data

Aug. 25, 2021    (IN) .............................. 202141038587
Nov. 22, 2021    (EP) ..................................... 21209479
Dec. 14, 2021    (IN) .............................. 202141058191

(51) Int. Cl.
*H04N 19/124* (2014.01)
*G06V 10/771* (2022.01)
(Continued)

(52) U.S. Cl.
CPC ......... *H04N 19/124* (2014.11); *G06V 10/771* (2022.01); *G06V 10/803* (2022.01);
(Continued)

(58) Field of Classification Search
CPC .... G06N 3/0455; G06N 3/0464; G06N 3/048; G06T 9/002; H04N 19/147; H04N 19/593
See application file for complete search history.

(56) References Cited

U.S. PATENT DOCUMENTS

2003/0163209 A1* 8/2003 Fukuhara .............. G06F 17/148
                                                              700/55
2017/0230675 A1* 8/2017 Wierstra .................. G06N 3/08
                          (Continued)

FOREIGN PATENT DOCUMENTS

JP          H07322197 A          12/1995
JP          2020191631 A          11/2020

OTHER PUBLICATIONS

Balle, J., et al., Variational Image Compression with a Scale Hyperprior, ICLR 2018 Conference Paper, Cornell University Library, Feb. 1, 2018, Ithaca, NY, XP081231708, 23 pages.
(Continued)

*Primary Examiner* — Fabio S Lima

(57)          ABSTRACT
Methods, systems, and bitstream syntax are described for the fusion of latent features in multi-level, end-to-end, neural
(Continued)

networks used in image and video compression. The fused architecture may be static or dynamic based on image characteristics (e.g., natural images versus screen content images) or other coding parameters, such as bitrate constrains or rate-distortion optimization. A variety of multi-level fusion architectures are discussed.

25 Claims, 8 Drawing Sheets

(51) Int. Cl.

| | |
|---|---|
| *G06V 10/80* | (2022.01) |
| *H04N 19/46* | (2014.01) |
| *H04N 19/59* | (2014.01) |
| *H04N 19/70* | (2014.01) |

(52) U.S. Cl.
CPC ............. *H04N 19/46* (2014.11); *H04N 19/59* (2014.11); *H04N 19/70* (2014.11)

(56) References Cited

U.S. PATENT DOCUMENTS

| | | | |
|---|---|---|---|
| 2018/0315159 A1* | 11/2018 | Ould-Ahmed-Vall | ....................... |
| | | | G06F 9/30185 |
| 2020/0372684 A1 | 11/2020 | Wen | |
| 2021/0125338 A1* | 4/2021 | Zhang ................. | G06F 18/2411 |
| 2022/0019843 A1* | 1/2022 | Wang ..................... | G06V 10/82 |
| 2022/0215592 A1* | 7/2022 | Jiang ........................ | G06N 3/08 |

OTHER PUBLICATIONS

Chaoxu Guo, Bin Fan, Qian Zhang, Shiming Xiang, and Chunhong Pan. "Augfpn: Improving multiscale feature learning for object detection". In Proceedings of the IEEE/CVF Conference on Computer Vision and Pattern Recognition, pp. 12595-12604, 2020, 10 pages.

David Minnen, Johannes Balle, and George D Toderici. "Joint autoregressive and hierarchical priors for learned image compression". In Advances in Neural Information Processing Systems, pp. 10771-10780, 2018, 10 pages.

Duda, Jarek. (2013). Asymmetric numeral systems: entropy coding combining speed of Huffman coding with compression rate of arithmetic coding. arXiv:1311.2540, 24 pages.

G. Lu, W. Ouyang, D. Xu, X. Zhang, C. Cai, and Z. Gao. "DVC: An end-to-end deep video compression framework," in CVPR, 2019, 14 pages.

He, K., et al., Deep Residual Learning for Image Recognition, p. 1-12, Dec. 10, 2015, XP055717904, https://arxiv.org/pdf/1512.03385. pdf, 12 pages..

Li, J., et al., Fully Connected Network-Based Intra Prediction for Image Coding, IEEE Transactions on Image Processing, pp. 3236-3247 , 27:7, Jul. 1, 2018, XP055759324, 12 pages.

Lin, T., et al., Feature Pyramid Networks for Object Detection, Cornell University Library, Dec. 9, 2016, Ithaca, NY, XP080738158, DOI: 10.1109/CVPR.2017.106, 10 pages.

Moon, H., et al., Use Cases for Coded Representation of Neural Networks: Two Cases of Image/Video Compression, 122 MPEG Meeting, ISO/IEC JTC1/SC29/WG11, Coding of Moving Pictures and Audio, Apr. 2018, San Diego, California, 6 pages.

S. Liu, X. Xu, S. Lei, and K. Jou, "Overview of hevc extensions on screen content coding," APSIPA Transactions on Signal and Information Processing, vol. 4, p. e10, 2015, 13 pages.

Theis, L., et al., Lossy Image Compression With Compressive Autoencoders, ICLR 2017 Conference Paper, Cornell University Library, Mar. 1, 2017, Ithaca, NY, XP080753545, 19 pages.

Tsung-Yi Lin, Piotr Dollar, Ross Girshick, Kaiming He, Bharath Hariharan, and Serge Belongie. "Feature pyramid networks for object detection". In Proceedings of the IEEE conference on computer vision and pattern recognition, pp. 2117-2125, 2017, 10 pages.

Y. Han, et al.,"Dynamic Neural Networks: A Survey" in IEEE Transactions on Pattern Analysis & Machine Intelligence, vol. 44, No. 11, pp. 7436-7456, 2022. https://arxiv.org/pdf/2102.04906, 12 pages.

Zhengxue Cheng, Heming Sun, Masaru Takeuchi, and Jiro Katto. "Learned image compression with discretized gaussian mixture likelihoods and attention modules. In Proceedings of the IEEE/CVF Conference on Computer Vision and Pattern Recognition", pp. 7939-7948, 2020, 15 pages.

Zhou, L., et al., Variational Autoencoder for Low bit-rate Image Compression, Proceedings of the IEEE Conference on Computer Vision and Pattern Recognition (CVPR) Workshops, Jun. 18, 2018, pp. 1-4, XP055917896, 4 pages.

Zhu, Mingjian & Han, Kai & Yu, Changbin, and Wang, Yunhe. "Dynamic Feature Pyramid Networks for Object Detection". (2020).

* cited by examiner

MULTI-LEVEL LATENT FUSION IN NEURAL NETWORKS FOR IMAGE AND VIDEO CODING

CROSS-REFERENCE TO RELATED APPLICATIONS

This application is a U.S. National Stage application under U.S.C. 371 of International Application No. PCT/US2022/039267, filed on 3 Aug. 2022, which claims the benefit of priority to the following applications: Indian provisional patent application 202141038587, filed on 25 Aug. 2021, U.S. provisional patent application 63/257,388, filed on 19 Oct. 2021, European patent application 21209479.1, filed on 22 Nov. 2021, and Indian provisional patent application 202141058191, filed on 14 Dec. 2021, each of which is hereby incorporated in their entireties.

TECHNOLOGY

The present document relates generally to images. More particularly, an embodiment of the present invention relates to multi-level latent fusion in neural nets being used for image and video coding.

BACKGROUND

In 2020, the MPEG group in the International Standardization Organization (ISO), jointly with the International Telecommunications Union (ITU), released the first version of the Versatile Video coding Standard (VVC), also known as H.266. More recently, the same joint group (JVET) and experts in still-image compression (JPEG) have started working on the development of the next generation of coding standards that will provide improved coding performance over existing image and video coding technologies. As part of this investigation, coding techniques based on artificial intelligence and deep learning are also examined. As used herein the term "deep learning" refers to neural networks having at least three layers, and preferably more than three layers.

As appreciated by the inventors here, improved techniques for the coding of images and video based on neural networks are described herein.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section. Similarly, issues identified with respect to one or more approaches should not assume to have been recognized in any prior art on the basis of this section, unless otherwise indicated.

BRIEF DESCRIPTION OF THE DRAWINGS

An embodiment of the present invention is illustrated by way of example, and not in way by limitation, in the figures of the accompanying drawings and in which like reference numerals refer to similar elements and in which.

DESCRIPTION OF EXAMPLE EMBODIMENTS

Example embodiments that relate to multi-level latent fusion in neural networks used in image and video coding are described herein. In the following description, for the purposes of explanation, numerous specific details are set forth in order to provide a thorough understanding of the various embodiments of present invention. It will be apparent, however, that the various embodiments of the present invention may be practiced without these specific details. In other instances, well-known structures and devices are not described in exhaustive detail, in order to avoid unnecessarily occluding, obscuring, or obfuscating embodiments of the present invention.

Summary

Example embodiments described herein relate to image and video coding using neural networks. In an embodiment, a processor receives an input image at an input spatial resolution to be compressed using latent features. Next, the processor:

processes the input image using a plurality of consecutive levels of convolution networks to generate a fused output of latents, wherein for each network level of the plurality of convolution networks its output has a lower spatial resolution than its input;

quantizes the fused output of latents to generate quantized fused latents; and applies arithmetic encoding to the quantized fused latents to generate coded fused latents, wherein generating the fused output of latents further comprises:

selecting latent outputs from two or more convolution networks among the plurality of consecutive levels of convolution networks: and fusing the selected latent outputs to generate the fused output of latents.

In another embodiment, a processor receives an input image at an input spatial resolution to be compressed using latent features. Next, the processor:

processes the input image using a plurality of consecutive levels of convolution networks to generate one or more fused output of latents, wherein for each level network of the plurality of convolution networks, its output has a lower spatial resolution than its input;

selects a level L1 of latents with an L1 output and a level L2 of latents, with an L2 output, wherein the level L2 is subsequent of the level L1;

generates an up-scaled level L2 output by upscaling the L2 output to match the spatial resolution of the L1 output;

combines the up-scaled L2 output and the L1 output to generate a fused L1 output;

quantizes and coding the fused L1 output to generate a fused coded L1 output; and quantizes and coding the L2 output to generate a coded L2 output.

Example End-to-End Video Coding Model

Figure 1:
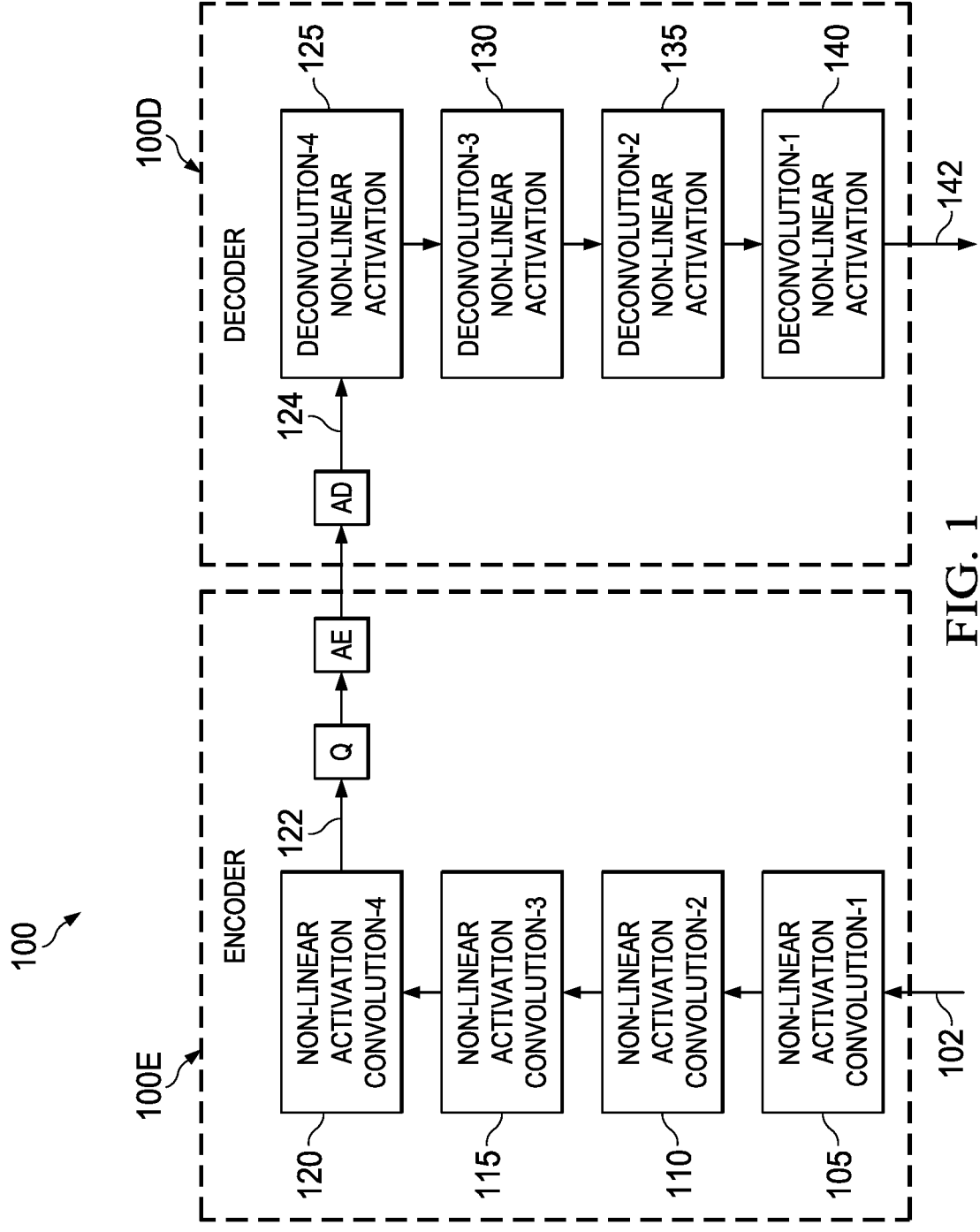
FIG. 1 depicts an example neural-network model for end-to-end image and video coding.

Deep learning-based image and video compression approaches are increasingly popular, and it is an area of active research. Most of the popular approaches are based on variational autoencoders employing Convolutional Neural Networks (CNNs) which are end-to-end trained on a training dataset. FIG. 1 depicts an example of a process pipeline (100) of such a scheme (Refs. [1-2], [6]) using a four-layer architecture for the coding and decoding of latent features.

As used herein, the terms "latent features" or "latent variables" denote features or variables that are not directly observable but are rather inferred from other observable features or variables, e.g., by processing the directly observable variables. In image and video coding, the term 'latent space' may refer to a representation of the compressed data in which similar data points are closer together. In video coding, examples of latent features include the representation of the transform coefficients, the residuals, the motion representation, syntax elements, model information, and the like. In the context of neural networks, latent spaces are useful for learning data features and for finding simpler representations of the image data for analysis.

As depicted in FIG. 1, given input images x (102) at an input h×w resolution, in an encoder (100E), the input image is processed by a series of convolution neural network blocks (also to be referred to as convolution networks or convolution blocks), each followed by a non-linear activation function (105, 110, 115, 120). At each such layer (which may include multiple sub-layers of convolutional networks and activation functions), its output is typically reduced (e.g., by a factor of 2 or more, typically referred to as "stride," where stride=1 has no down-sampling, stride=2 refers to down-sampling by a factor of two in each direction, etc.). For example, using stride=2, the output of the convolution-1 network (105) will be h/2×w/2. The final layer (e.g., 120) generates output latent coefficients y (122), which are further quantized (Q) and entropy-coded (e.g., by arithmetic encoder AE) before being sent to decoder (100D). A hyper-prior network and a spatial context model network (not shown) are also used for generating the probability models of the latents (y).

In a decoder (100D), the process is reversed. After arithmetic decoding (AD), given decoded latents ŷ (124), a series of deconvolution layers (125, 130, 135, 140), each one combining deconvolution neural network blocks and non-linear activation functions, is used to generate an output x̂ (142), approximating the input (102). In the decoder, the output resolution of each deconvolution layer is typically increased (e.g., by a factor of 2 or more), matching the down-sampling factor in the corresponding convolution level in the encoder 100E so that input and output images have the same resolution.

In such architectures, the receptive field area of the latents increases based on the down-sampling ratio and the kernel size used in each layer shown in FIG. 1. As the main latents are coded at the last layer depth (e.g., 120), they typically have a high receptive field size based on the number of layers (typically, 4 to 6), the down-sampling ratio (typically, 2), and the kernel size (typically, 3×3 to 5×5) used in each layer. Such fixed-depth-based neural networks were developed mainly for coding natural images and may not be optimal to code the latent features of varying spatial sizes and characteristics of textures, edges, and smooth areas in highly diverse set of image/video sources such as screen content, natural content, user generated content, computed generated images (CGI) based gaming and animation content, mixed contents, and the like, for different operating bitrates. For example, screen content images (SCI) have significant differences from natural images in the color structure and statistics. SCIs tend to have abrupt color changes and uniform color regions more often compared to natural images. Also, SCIs often have text which can be of varying size, from extra small to large. Good reproduction of SCIs therefore requires the ability to handle intensity variations in widely different spatial scales. The proposed embodiments enable deep learning-based image and video codecs to adaptively fuse and code the latents of different layer depths, which enables multi-level receptive fields based latent coding architecture for optimal rate-distortion coding performance for diverse set of contents. Multi-level receptive field coding architectures can be loosely related to variable block size coding in conventional block based video codecs, but do not require explicit coding of specific size and structure of the transform or prediction blocks.

Deep-learning architectures for image and video coding are approaching to be competitive with the conventional methods in the case of natural images. While the proposed adaptive multi-level latent fusion methods can advance this state of the art for natural images and videos, they are particularly beneficial for screen content compression. For SCIs, the current deep-learning schemes significantly lag behind the conventional methods and the proposed methods yield significantly better results.

Embodiments of the proposed architectures are motivated by the feature pyramid network (FPN) introduced in the object detection and object classification literature where the goal was to improve the detection and classification of objects across scale (Ref. [4]). Conventional image coding standards, such as HEVC and VVC, use several special techniques to compress SCI images efficiently. For example, the HEVC standard has adopted special tools, like: intra block copy, palette coding, adaptive color transform, and adaptive motion resolution to deal with SC videos (Ref. [5]). Further gains may be possible by incorporating some of those ideas into the CNN-based codecs in a more direct fashion, though, at this point, this is a topic of ongoing research.

Multi-Level Latent Fusion

In the CNN-based architectures currently used for image compression (Refs [1-2]), there is a feature hierarchy organized into a number of levels (or layers), and there is an output down-sampling from one level to the next. This leads to a progressively decreasing spatial resolution of the feature maps with each subsequent level, while, at the same time, the receptive fields of the convolutional filters are increasing. Features from the higher levels tend to be semantically stronger, capable of greater representational capacity and compression, but spatially less well localized because of the reduced spatial resolution. As depicted in FIG. 1, in the current compression methods, the latent features to be transmitted (e.g., 122) are obtained from the highest level of the network (e.g., 120). The limited spatial resolution and the large receptive fields of the latents may make the current architectures not particularly suitable for reconstructing small image structures, such as short edges, text characters, and the like, that are common in SCIs. During compression and decompression, loss of certain minute details of the text characters can sometimes reduce their readability.

On the other hand, features from the lower levels are more accurately localized. owing to their higher spatial resolution, as they are subsampled fewer times. Fusing features from multiple levels using lateral connections (also called skip connections) could leverage the strengths of the different levels in the feature hierarchy. Though this idea has previously been demonstrated in the literature to be helpful to improve the detection and classification of objects of varying size (Ref. [4]), to the best of our knowledge, it is novel in the domain of image and video compression, with demonstrable benefits in the compression of screen content images.

Figure 2:
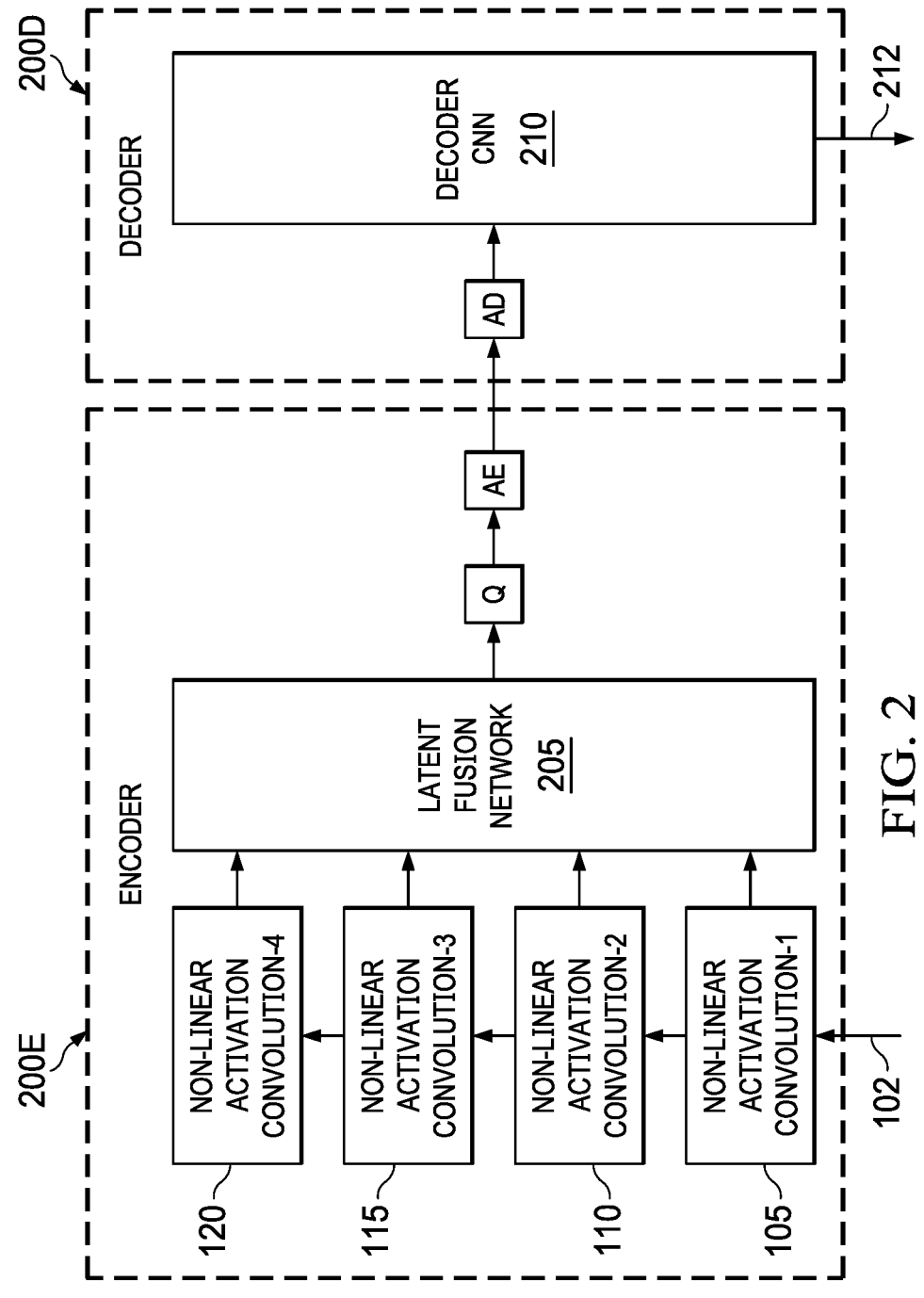
FIG. 2 depicts an example neural-network processing model for image and video coding using multi-level latent (MLL) fusion according to an embodiment of this invention.

FIG. 2 depicts an example embodiment of the proposed multi-level latents-fusion architecture, simply to be referred to as the MLL fusion architecture. Compared to FIG. 1 (100), in the encoder (200E), a new latent-fusion network (205) has been added. In the decoder (200D), the decoder CNN (210) is using an appropriate number of deconvolution/non-linear activation layers, as depicted in decoder 100D. As before, output 212 represents a decoded approximation of input 102. The latent fusion network (205) may take a variety of forms, and example embodiments are examined next.

Figures 3A, 3B:
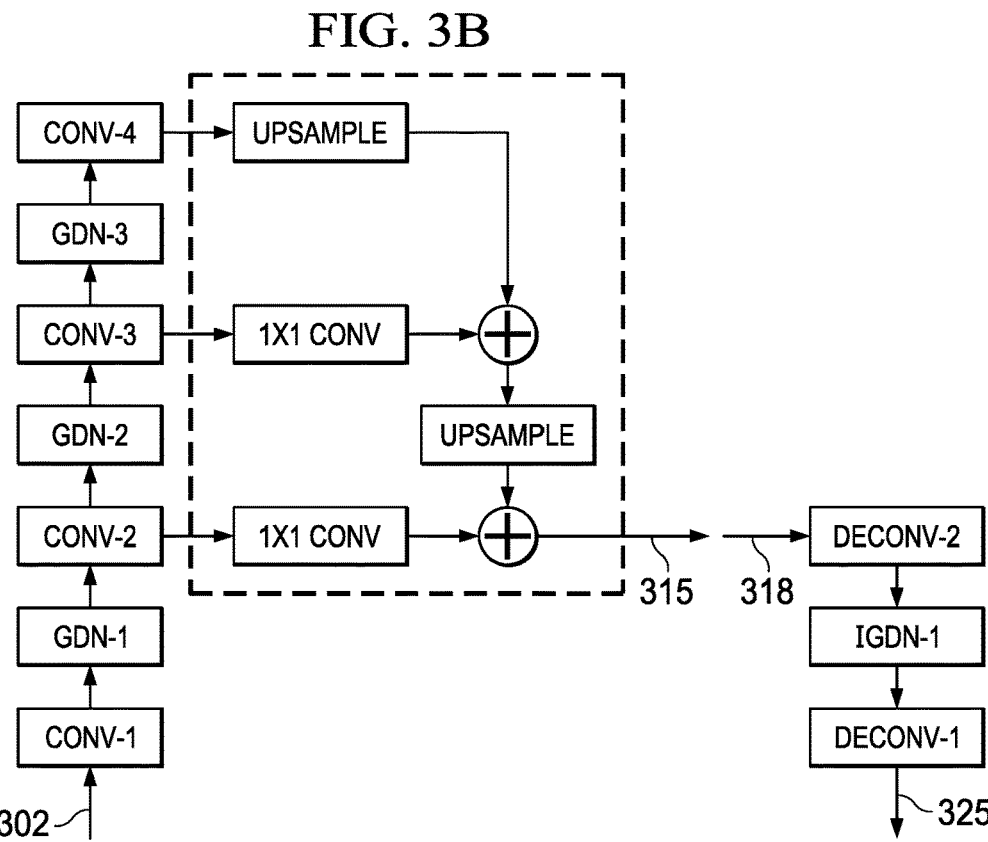
FIGS. 3A and 3B depict details of example MLL fusion neural nets according to embodiments of this invention.

FIG. 3A and FIG. 3B depict examples of MLL fusion architectures, where, for simplicity, the quantizer (Q), the arithmetic encoding (AE), and the arithmetic decoding (AD) blocks are not shown. In FIG. 3A, there is one fusion ladder, fusing the output of convolutional network 4 with the output of convolutional layer 3 to generate latents output 305. If convolution layer 4 has half the resolution of convolution layer 3, then the up-sample operation is up-sampling by 2. GDN stands for generalized divisive normalization, and IGDN stands for inverse GDN, non-linearities which implement local divisive normalization, a type of transformation that has been shown to be rather effective in the compression of images (Ref. [1-2]). For example, GDN/IGDN functions are available as part of the Tensorflow compression toolbox (Ref. [11]). "Conv" blocks denote convolutional networks (e.g., m×n×C×K, S, where m×n denotes the convolution kernel, C denotes the number of channels being processed, K is the number of convolution kernels, and S denotes the stride). As an example, a filter bank of the size 3×3×1×2, S=1, is composed of 2 convolution kernels, each of which operates on one channel and has a size of 3 pixels by 3 pixels, with a stride of 1. "Deconv" blocks denote deconvolution blocks. The 1×1 convolution layer is required to match the number of channels between the feature levels being fused. As depicted in FIG. 3A, the decoder network comprises Deconv and IGDN blocks and is modified by removing the first incoming deconvolution layer (e.g., Deconv-4) to generate output 322, which is a decoded approximation of input 302. Alternatively, one can maintain that extra deconvolution layer (e.g., Deconv-4), but, as the latents (305) are coded at Layer 3 (say, at 2× the resolution of Layer 4), the stride of Deconv-4 should be set to unity so there is no further up-sampling.

FIG. 3B is similar to the architecture of FIG. 3A, but fuses features from three levels: levels 2, 3, and 4, to generate latents (315) at the second level. Again, in a decoder, the two top-most levels are removed (Deconv-4 and Deconv-3), and given decoded latents 318, the decoder generates output 325 approximating input 302.

These architectures can easily be extended to architectures with more than four levels, and to fuse more than three levels.

Dynamic MLL Fusion Architecture

Figures 4, 6C:
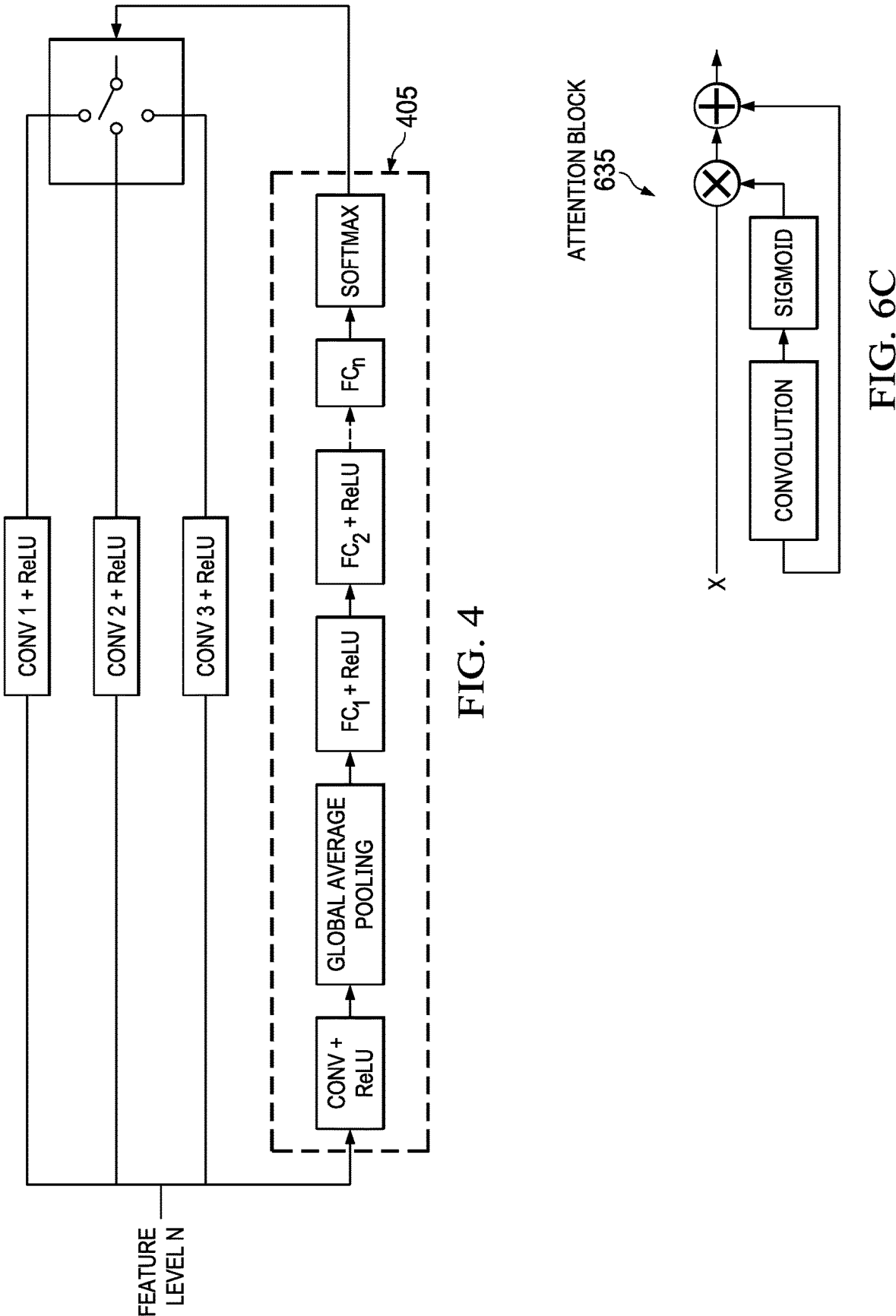
FIG. 4 depicts an example fusion-gate for MLL fusion architectures with dynamic fusion according to an embodiment of this invention.
FIG. 6C depicts an example Attention block using a single layer convolution and a sigmoid block.

In FIGS. 3A and 3B the fusion network employs a 1×1 convolutional network. In another embodiment, the receptive field size for each feature level can be individually controlled in an image-adaptive way by switching the convolution kernel width within this convolution block, based on features of the input image. FIG. 4 depicts an example architecture of what is to be referred as a "dynamic gate," inspired by the dynamic feature network (FPN) in Ref. [8], used for efficient feature extraction. As depicted in FIG. 4, a gating logic (405), based on a separate neural-network, is being used to adaptively select the processing convolution kernels (e.g., Conv 1, Conv 2, Conv 3, and the like which can respectively be of size 1×1, 3×3, 5×5, and the like). In an embodiment, one may even use a combination of such convolution networks (e.g., Conv 1 (1×1)+Conv 2 (3×3)+ Conv 3 (5×5)). The dynamic gate allows an encoder an extra level of adaptability to the image being compressed, potentially giving more compression efficiency. For example, an encoder may use kernels based on whether the input consists of natural or screen-content images, or according to some other criterion for which neural network (NN) 405 is trained. The gating logic (405) comprises a convolutional layer, a global average pooling layer, two or more fully connected layers ($FC_1$, $FC_2$, . . . , $FC_n$), and terminates with a Softmax function. The convolutional layer and each of the fully connected layers, except the last one (e.g., $FC_n$), are followed by a Rectified Linear Unit (ReLU) activation function layer (denoted in the figure by "+ReLU").

Experimental results have indicated that in image and video coding, specific bitrate constraints or requirements may require transmitting different number of layers. As an example, returning to FIG. 2, a low bitrate requirement may require adding a new convolution level (say, convolution-5, not shown) and fuse it with convolution layer 4 or another layer. This can help reduce the number of latents to be coded (thus, reducing the number of bits per pixels) and at the same time help to increase image quality. Accordingly, in an embodiment, a fixed latent fusion network (205) may be replaced by a learning switch network or gate network which can be used to dynamically select which layers are to be fused. This can be considered analogous to the concept of block-size adaptation used in traditional codecs. In addition, the network can adapt their layer architecture to the input image/video and required bitrate/quality during the inference, e.g., using dynamic neural network (Ref. [10]). Thus, the MLL architecture can be applied directly to dynamic neural network architectures. In such a scenario, an encoder may need to send additional MLL fusion metadata to inform the decoder on how to adjust the decoding convolution layers according to the selected fusion structure of the encoder (see examples in the decoders in FIGS. 3A and 3B). Examples of such metadata are given later (see Tables 1-4).

Spatially-Weighted MLL Fusion Architecture

Figure 5:
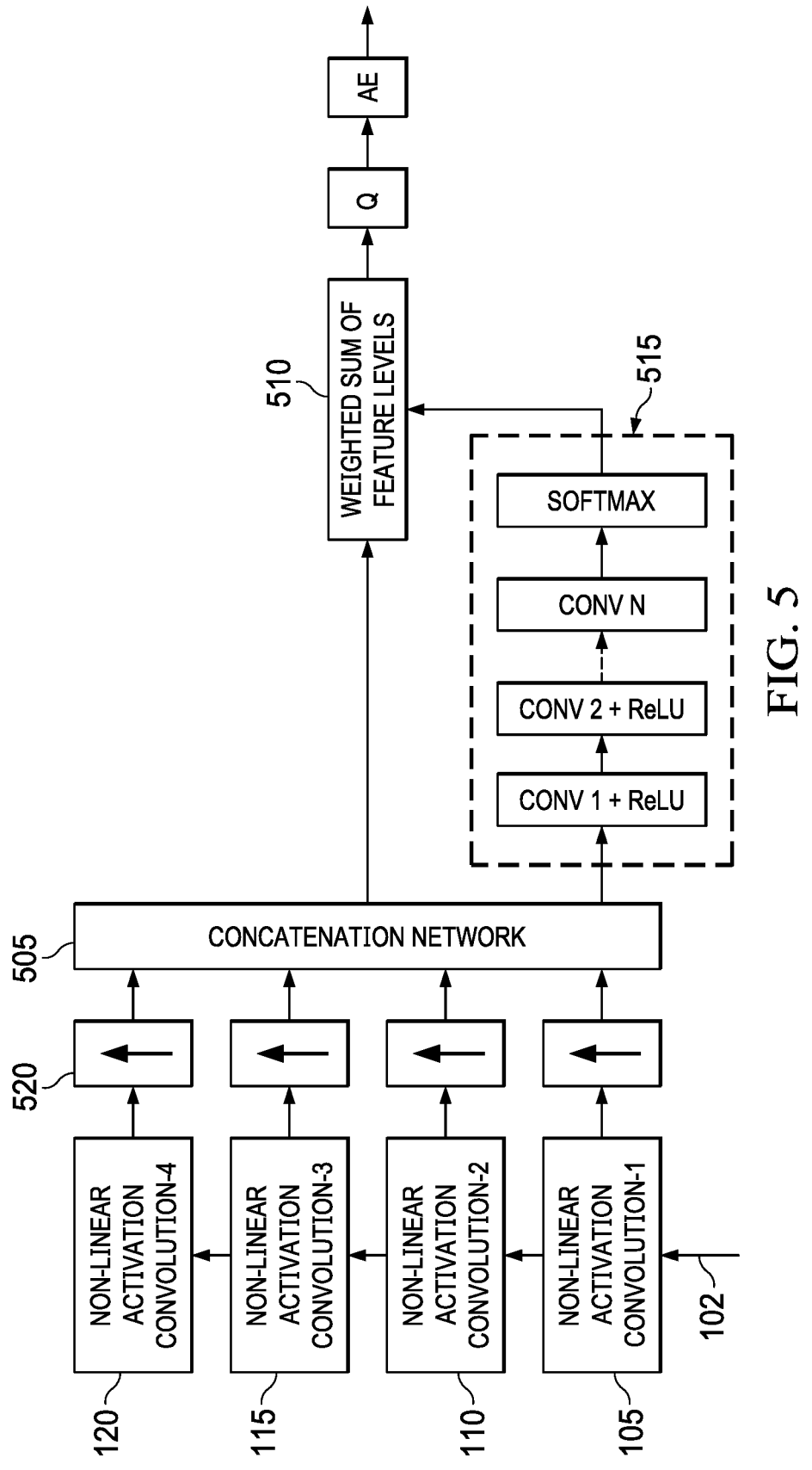
FIG. 5 depicts an example of a spatially-weighted MLL fusion architecture according to an embodiment of this invention.

In another embodiment, instead of using simple addition to fuse layers, one may apply spatially-weighted fusion (Ref. [9]). FIG. 5 depicts an example of such an embodiment. As depicted in FIG. 5, one starts by first concatenating the feature levels of interest using a concatenation network (505). Note that before the layers are concatenated, they need to be properly up-sampled (520) so that all feature layers have the same spatial resolution (say, w×h). While FIG. 5 depicts all four layers to be concatenated, one may select to concatenate only two or three layers (as in FIG. 3A or 3B, and the like).

A separate, attention-like network (515) may be used to generate the weight maps. Specifically, network 515 takes up-sampled features as input and produces one spatial weight map for each feature. For example, if we concatenate N layers, with C channels each, the input to the concatenator will be N(C×h×w), and its output will be NC×h×w. In block 515, after the Conv 1 convolutional layer, there will be

7

Cxhxw outputs. As one needs the weighted aggregation of N layers, the subsequent one or more convolutional layers (Conv 2, Conv 3, and the like) reduce the outputs to Nxhxw, wherein the choice of 3x3 kernel size for the convolutional layers provides the flexibility of a small spatial receptive field to provide a better localized weight map. Each convolutional layer, except the last one, include a ReLU as the nonlinear activation function (denoted in the figure by "+ReLU"). A Softmax block generates the final weights.

In block 510, the feature levels are then fused using a weighted sum with the spatially varying weights. This has the additional advantage of the encoder being able to spatially adapt to the image being compressed. Thus, an encoder may be able to treat smooth and fast varying image regions differently using feature levels with suitable receptive field sizes. The decoder architecture is kept similar to FIG. 2, (e.g., see FIGS. 3A and 3B), depending on how many levels are fused together.

MLL With Multi-Level Transmission

Figure 6A:
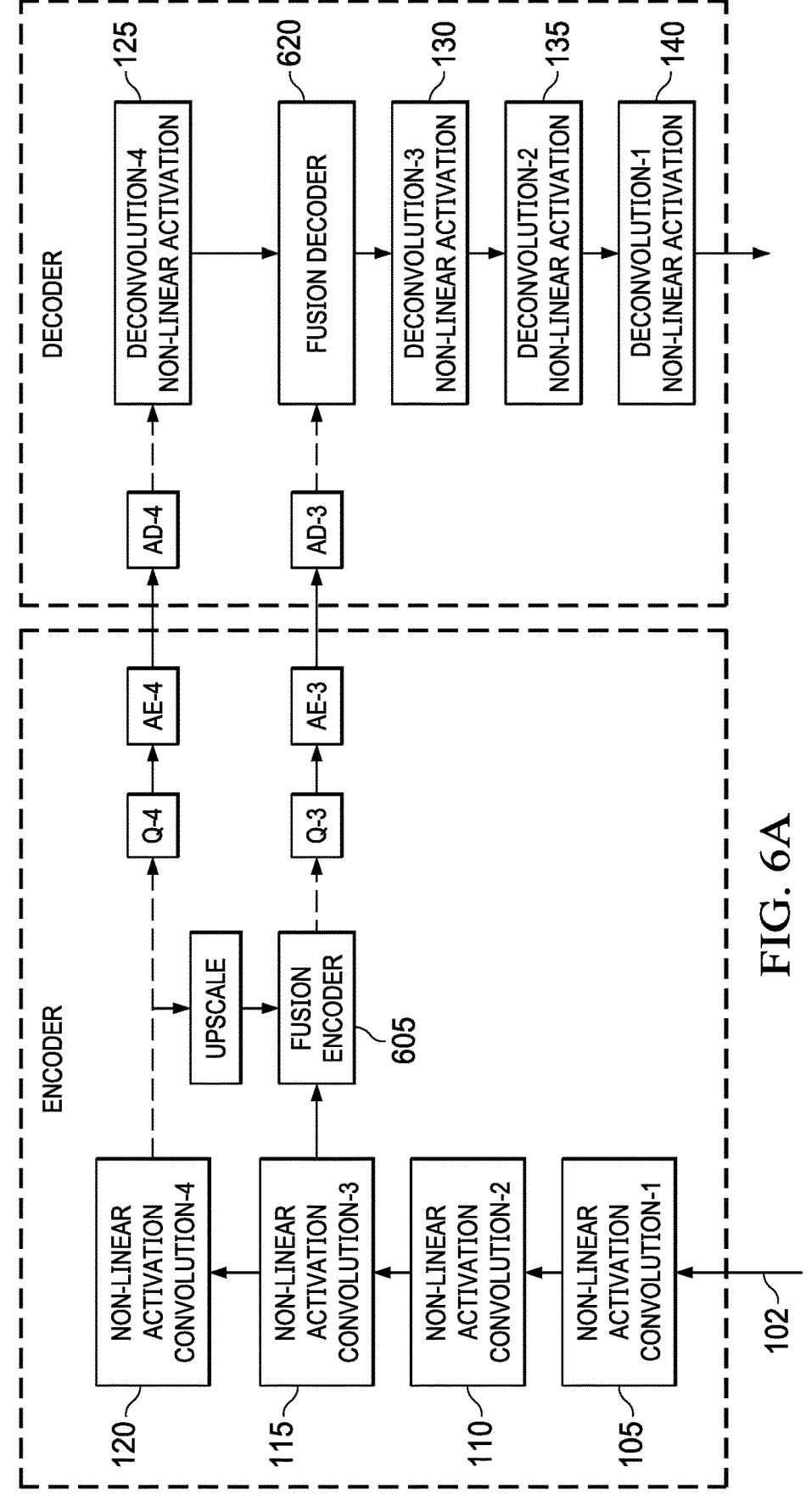
FIG. 6A and FIG. 6B depict examples of MLL fusion architectures with multi-layer transmission of latents.

FIG. 6A depicts another example of an MLL architecture according to an embodiment. In such a scenario, latents are transmitted at more than one level or at a level lower than the highest available level (at the lowest spatial resolution). As depicted in FIG. 6A, in this example, without limitation, latents are transmitted at both levels 4 and 3. Alternatively, as depicted by dotted lines denoting optional paths, only latents at layer 3 may be transmitted. The entropy model is modified to model the subsequent latent levels conditioned on the levels already sent, in order to reduce the number of bits needed to be sent. A fusion encoder network block (605), to fuse the two levels, can be addition, concatenation, or some other way of combining the latents.

In a decoder, a corresponding fusion decoder network (620) may precede deconvolution to reverse the operation of the fusion encoder network before the subsequent deconvolution layer (e.g., 130). Specifically, the fusion decoder network is used to merge the features from two neighboring inputs (e.g., from AD-3 and Deconv-4 (125)), which can be implemented as a simple concatenation layer or a prediction and residual fusion block. In this example, the features from the higher-level deconvolution block (125) are used for prediction and are combined with the residual features received from the current-level arithmetic decoder (AD-3). Subsequent processing in the decoder is similar as before.

Figure 6B:
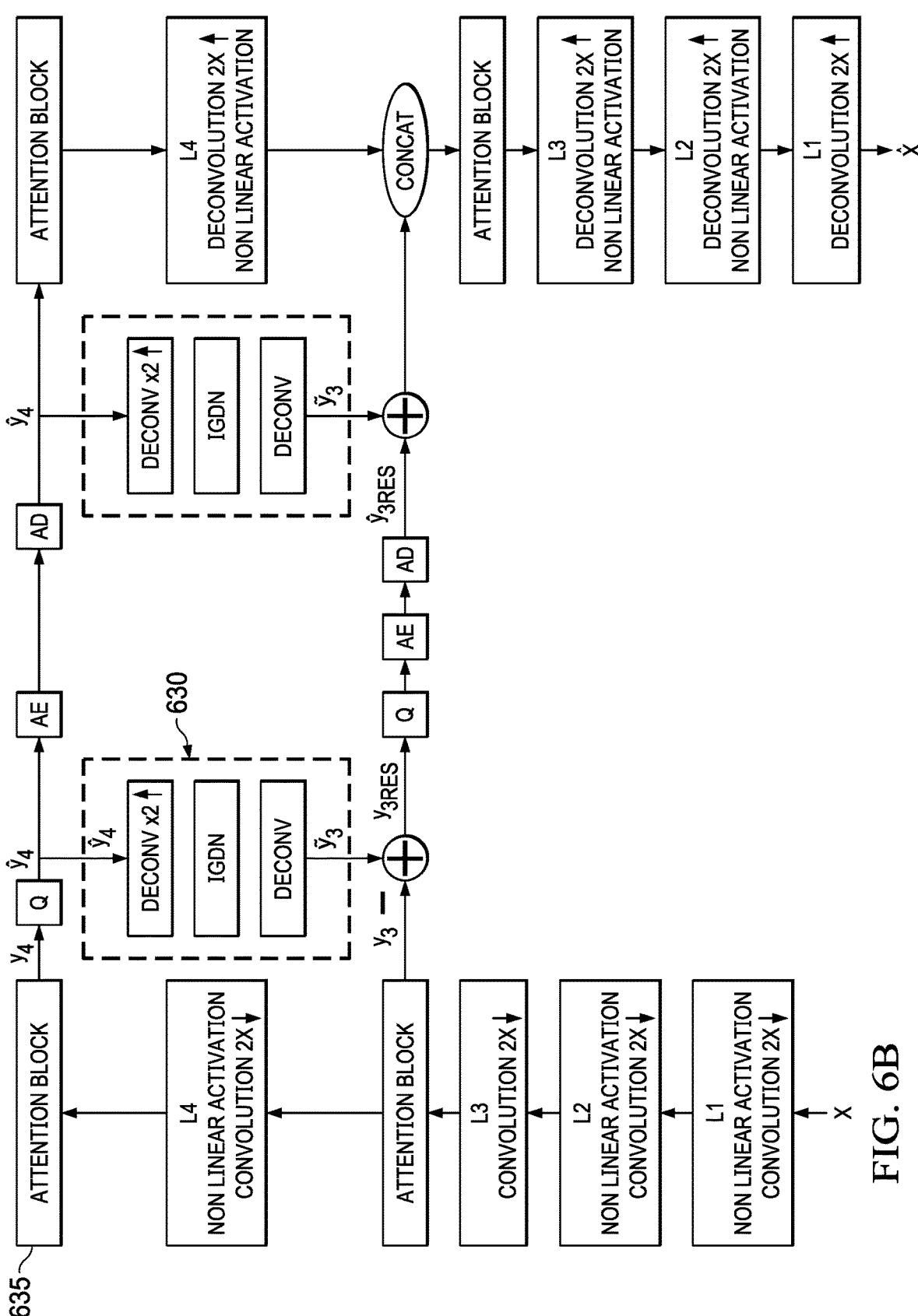

FIG. 6B depicts a sample variant of FIG. 6A in which latents are transmitted at levels 4 and 3, with the level 3 latents predicted using upscaled level 4 latents by a 2-layer deep deconvolution based predictor network (630), where the two deconvolution networks are separated by an inverse generalized divisive normalization (IGDN) network. The level 3 prediction residual $(y_3-\bar{y}_3)$ is transmitted for level 3 latents. This embodiment utilizes also a number of functions commonly referred to in NN processing as "attention blocks" (e.g., block 635), aiming at enhancing certain data more than other. In the embodiment of FIG. 6B, the attention blocks are also used to spatially weigh the level 4 and level 3 latents for adequate local adaptation. An example of an attention block used in FIG. 6B, using convolution and sigmoid layers, is depicted in FIG. 6C.

In FIG. 6B, the decoding path uses a similar architecture, where the predicted value based on the level 4 latents is added to the decoded level 3 latents before being concatenated with the level 4 latents.

As in Ref. [1], the training goal is to minimize the expected length of the bitstream as well as the expected distortion of the reconstructed image with respect to the original, giving rise to a rate-distortion (R/D) optimization problem:

$$R + \lambda D, \tag{1}$$

where $\lambda$ is the Lagrange multiplier that determines the desired rate-distortion (R/D) trade-off. In an embodiment, during training of this network, the training error function (e.g., D) is modified to have an additional term with a variable scale factor for the level 3 latent prediction's distortion, typically measured as the mean square error of the level-3 latent predictor, e.g., mean $((y_3-\bar{y}_3)^2)$. to ensure higher fidelity of the predicted level 3 latents. The initial prediction loss scale factor is set to 0.1 and gradually reduced to zero to achieve an adequate balance of the bitrate needed for transmitting level 4 and level 3 latents. A similar architecture can be applied to fuse and transmit more than two layers, by repeating the upscale, fusion encoder network, quantizer, and arithmetic coding blocks as needed.

Note: This particular architecture needs a decoder modification as the latents are explicitly coded at different levels and fused on the decoder side, whereas the earlier architectures had only one level of latents coded in the bit-stream and it did not require fusion at the decoder side.

Considerations for Video Coding

Figure 7:
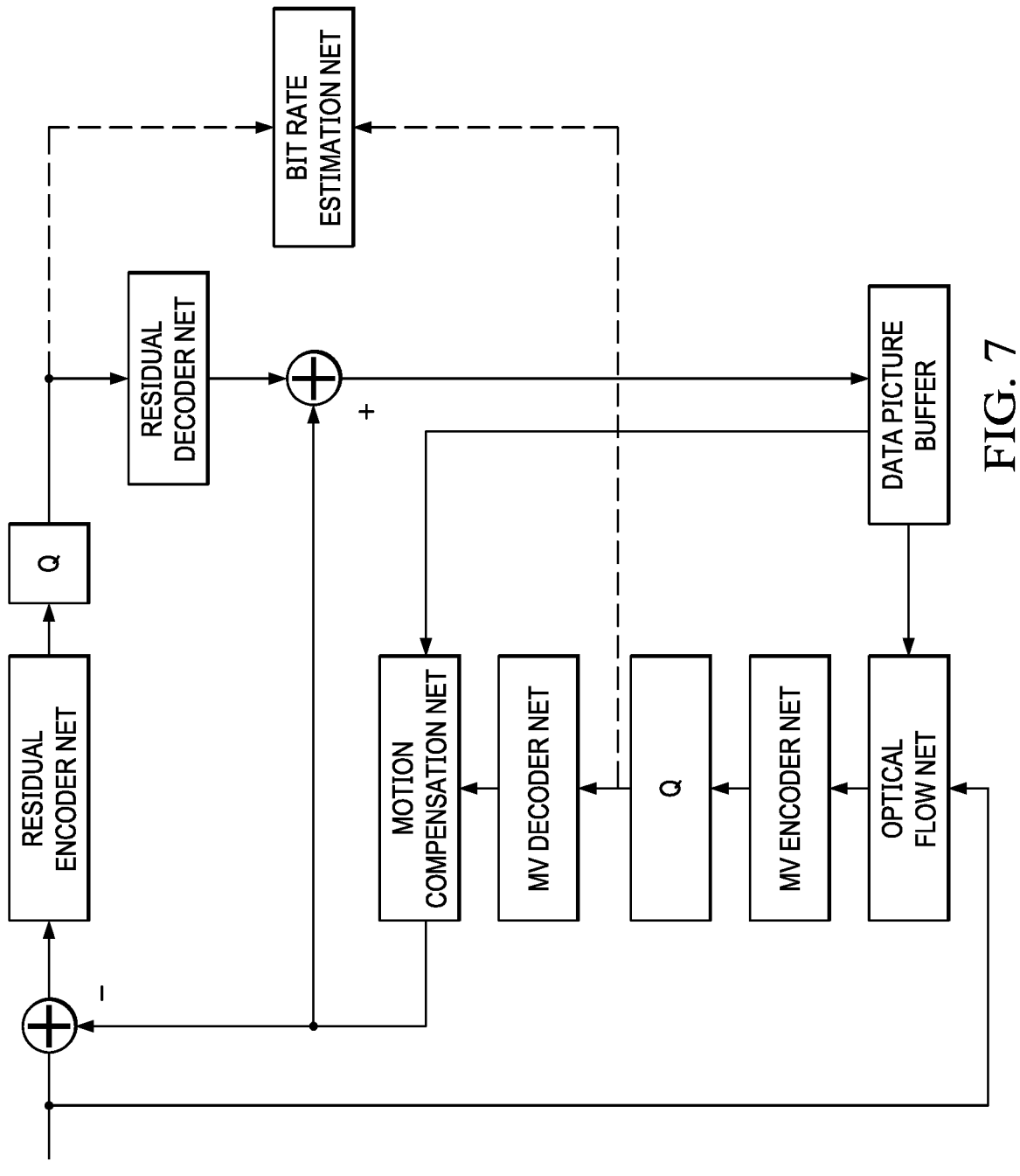
FIG. 7 depicts an example framework for using neural networks in video coding.

So far, example embodiments were centered on image compression: however, the same tools are also applicable to video compression as well. FIG. 7 depicts an example framework that uses neural networks at various stages of the video coding pipeline, where each such network replaces one or more existing traditional coding tools. The proposed architecture can be used in the compression of intra frames, residual (or inter-coded) frames, or to encode motion-vector information. In the case of residual frames, the potential for further compression efficiency may exist by adapting the entropy models to better match the residual image statistics. For the case of motion vector (MV) encoder and decoder networks, it has been shown that increasing the number of convolution levels (e.g., to 8 levels) can have significant gain for high bitrate, but relative lower gain for lower bitrate. Therefore, an MLL fusion architecture, as those proposed here, may either further improve the gain or reduce the complexity for lower bitrates. For example, in many cases, there is no need to have more than four layers.

Given an MLL fusion network, experimental results show that for different bitrate or quality requirements, to optimize performance, one may need to apply NNs with different number of total layers or different fusion models. One way to select the optimal neural network architecture is to exhaustively search all the options based on rate distortion optimization (RDO) at the encoder, and then select the neural network architecture with the best RDO. To further benefit from multiple MLL fusion networks, one can divide images (or input pictures) into patches (e.g., 128x128 or 256x256). Then for each patch, one can apply RDO to select the best network. Then, as part of high-level syntax (HLS) or as supplementary enhancement information (SEI) messaging, one can signal for each patch the best combination of neural network fusion parameters. This patch-based inference can be beneficial for parallelization, especially for high resolution images, like 4 k, 8 k, or higher. For video coding, one can also apply the patch based RDO framework for intra/inter/skip decision. In combination with an MLL fusion network, one should be able to build a network that supports multi-mode and multi-resolution adaptation at the granularity of patches.

The following Tables depict, without limitation, various examples of such high-level syntax for MLL fusion adaptation, according to embodiments. This high-level syntax can be part of a bitstream at multiple levels of hierarchy (e.g., at the video stream level, picture level, slice level, tile-level, and the like), or as separate SEI messaging. The syntax provides the following information: a) whether the division into patches is uniform or non-uniform (for example, see Table 1). b) MLL fusion adaptation information for each patch. Note: for part a), alternatively, one may apply syntax similar to the one used to denote uniform or non-uniform tiles in HEVC or VVC.

In a first example (Table 2), the general information of MLL fusion adaptation data is signaled first, then, an enabling flag is sent for each patch to enable or disable MLL fusion for the current patch. In a second example (Table 3), for each patch, a more detailed MLL fusion adaptation syntax is signaled. The first example requires less bits than the second example, but the second example has more flexibility.

TABLE 1

| Example of patch-related syntax for MML fusion adaptation | |
| --- | --- |
| | Descriptor |
| patch_map_syntax( payloadSize ) { | |
|   MLL_adaptation_enabled_flag | u(1) |
|   if ( MLL_adaptation_enabled_flag ) { | |
|     uniform_patch_flag | u(1) |
|     if (uniform_patch_flag) { | |
|       patch_width_in_luma_samples | ue(v) |
|       patch_height_in_luma_samples | ue(v) |
|     } else { | |
|       num_patch_columns_minus1 | ue(v) |
|       num_patch_rows_minus1 | ue(v) |
|       for ( i = 0; i < num_patch_columns_minus1; i++) | |
|         patch_column_width_minus1[i] | ue(v) |
|       for ( i = 0; i < num_patch_rows_minus1; i++) | |
|         patch_row_height_minus1[i[ | ue(v) |
|     } | |
|   } | |
| } | |

MLL_adaptation_enabled_flag equal to 1 specifies MLL adaptation is enabled for the decoded picture. MLL_adaptation_enabled_flag equal to 0 specifies MLL adaptation is not enabled for the decoded picture.

uniform_patch_flag equal to 1 specifies that patch column boundaries and patch row boundaries are distributed uniformly across the picture. uniform_patch_flag equal to 1 specifies that patch column boundaries and patch row boundaries are explicitly signaled.

patch_width_in_luma_samples specifies the width, in units of luma samples, of the decoded picture. patch_wdith_in_luma_samples shall not be equal to 0 and shall be in integer multiple of 64. num_patch_columns_minus1 can be derived based on pic_width_in_luma_samples.

patch_height_in_luma_samples specifies the height, in units of luma samples, of the decoded picture. patch_height_in_luma_samples shall not be equal to 0 and shall be in integer multiple of 64. num_patch_rows_minus1 can be derived based on pic_height_in_luma_samples.

num_patch_columns_minus1 plus 1 specifies the number of patch columns for the current picture. When not present, if uniform_patch_flag equal to 1, the value is inferred as above. Otherwise, the value is inferred to be 0.

num_patch_rows_minus1 plus 1 specifies the number of patch rows for the current picture. When not present, if uniform_patch_flag equal to 1, the value is inferred as above. Otherwise, the value is inferred to be 0.

patch_column_width_minus1[i] plus 1 specifies the width of the i-th patch column.

patch_row_height_minus1[i] plus 1 specifies the height of the i-th patch row.

TABLE 2

| First Example of High-Level Syntax for MLL fusion adaptation | |
| --- | --- |
| | Descriptor |
| MLL_adaptation_syntax( payloadSize ) { | |
|   MLL_adaptation_enabled_flag | u(1) |
|   if ( MLL_adaptation_enabled_flag ) { | |
|     intra_MLL_adaptation_enabled_flag | u(1) |
|     if ( intra_MLL_adaptation_enabled_flag ) | |
|       intra_fusion_idc | ue(v) |
|       intra_num_layers_minus1 | ue(v) |
|     } | |
|     inter_MLL_adaptation_enabled_flag | u(1) |
|     if ( inter_MLL_adaptation_enabled_flag ) | |
|       inter_mv_fusion_idc | ue(v) |
|       inter_mv_num_layers_minus1 | ue(v) |
|       inter_residue_fusion_idc | ue(v) |
|       inter_residue_num_layers_minus1 | ue(v) |
|     } | |
|     for ( j = 0; j <= num_patch_rows_minus1; j++) | |
|       for ( i = 0; i < num_patch_columns_minus1; i++) | |
|         patch_MLL_adaptation_enabled_flag [j][i] | u(1) |
|   } | |
| } | |

In Table 2, one first signals intra and inter MLL fusion related information. (note: if MLL_adaptation_enabled_flag equal to 1, intra_MLL_adaptation_enabled_flag||inter_MLL_adaptation_enabled_flag shall be equal to 1). Then, for each patch, one signals if MLL is enabled or not for that patch.

intra_MLL_adaptation_enabled_flag equal to 1 specifies MLL adaptation is enabled for intra coding for the decoded picture. intra_MLL_adaptation_enabled_flag equal to 0 specifies intra MLL adaptation is not enabled for intra coding for the decoded picture.

intra_fusion_idc specifies the fusion method used for intra MLL. Note: examples of fusion idc values can be: 0 for the MLL fusion architecture as depicted in FIG. 3A/FIG. 3B, 1 for dynamic MLL fusion architecture as depicted in FIG. 4, 2 for spatially weighted MLL fusion architecture as depicted in FIG. 5, and the like.

intra_num_layers_minus1 plus 1 specifies the number of layers used for intra MLL.

inter_mv_fusion_idc specifies the fusion method used for inter mv MLL.

inter_mv_num_layers_minus1 plus 1 specifies the number of layers used for an inter motion-vector MLL fusion network.

inter_residue_fusion_idc specifies the fusion method used for an inter-residue MLL network.

inter_residue_num_layers_minus1 plus 1 specifies the number of layers used for inter residue MLL.

patch_MLL_adaptation_enabled_flag[j][i] equal to 1 specifies MLL adaptation is enabled for j-th patch row and i-th patch column. patch_MLL_adaptation_enabled_flag[j][i] equal to 0 specifies MLL adaptation is not enabled for j-th patch row and i-th patch column.

patch_intra_MLL_adaptation_enabled_flag[j][i] is set to equal to (patch_MLL_adaptation_enabled_flag [j][i] & intra_MLL_adaptation_enabled_flag). patch_inter_MLL_adaptation_enabled_flag[j][i] is set to equal to (patch_MLL_adaptation_enabled_flag[j][i] & inter_

MLL_adaptation_enabled_flag). In another embodiment, we do not signal patch_MLL_adaptation_enabled_flag[j][i]. but instead signal patch_intra_MLL_adaptation_enabled_flag[j][i] and patch_inter_MLL_adaptation_enabled_flag[j][i] directly.

Note: it is assumed that for each patch, intra_MLL and inter_MLL are all allowed. if only one case is allowed, one only needs to signal that case. The same assumption holds for the next example.

In another example, as shown in Table 3, one signals all the MLL fusion-adaptation related information for each patch to allow more flexibility. For example, the syntax in Table 3 allows some patches to be coded as Intra-coded patches and some patches to be coded as Inter-coded patches.

TABLE 3

Second Example of High-Level Syntax for MLL fusion adaptation

| | Descriptor |
|---|---|
| MLL_adaptation_syntax( payloadSize ) { | |
|   MLL_adaptation_enabled_flag | u(1) |
|   if ( MLL_adaptation_enabled_flag ) { | |
|     for ( j = 0; j <= num_patch_rows_minus1; j++) | |
|       for ( i = 0; i < num_patch_columns_minus1; i++) { | |
|         intra_MLL_adaptation_enabled_flag [j][i] | u(1) |
|         if ( intra_MLL_adaptation_enabled_flag [j][i]) | |
|           intra_fusion_idc [j][i] | ue(v) |
|           intra_num_layers_minus1[j][i] | ue(v) |
|         } | |
|         inter_MLL_adaptation_enabled_flag[j][i] | u(1) |
|         if ( inter_MLL_adaptation_enabled_flag[j][i] ) | |
|           inter_mv_fusion_idc[j][i] | ue(v) |
|           inter_mv_num_layers_minus1[j][i] | ue(v) |
|           inter_residue_fusion_idc[j][i] | ue(v) |
|           inter_residue_num_layers_minus1[j][i] | ue(v) |
|         } | |
|       } | |
|   } | |
| } | |

The above syntax, for simplicity, supports fusing only the highest two levels. If there is a need to fuse more than two layers new syntax elements (e.g., xxx_num_fusion_layers_minus2 and xxx_fusion_layer_number[i], where "xxx" can be "inter," "intra," and the like) may be added to identify which levels are fused and how. For example, Table 4 provides an example of such syntax for intra coding using MLL fusion adaptation with more than two layers.

TABLE 4

Example for MLL fusion adaptation with more than two fused layers

| | Descriptor |
|---|---|
| INTRA_MLL_adaptation_syntax( payloadSize ) { | |
|   intra_fusion_idc | ue(v) |
|   intra_num_layers_minus1 | ue(v) |
|   intra_num_fusion_layers_minus2 | ue(v) |
|   for ( i = 0; i < intra_num_fusion_layers_minus2 + 2; i++ ) | |
|     intra_fusion_layer_number[i] | ue(v) |
| } | | intra_num_fusion_layers_minus2 plus 2 specifies the number of layers to be fused for intra MLL.

intra_fusion_layer_number[i] specifies the layer number for the i-th fused layer.

Similar syntax may be applied to other neural nets used in video coding. It is noted that patch-based algorithms may result in boundary artifacts at patch boundaries. A deblocking filter or a NN-based in-loop filter can be added to resolve such issues.

Latent Scalability

Experimental results showed that latent energies (e.g., in an embodiment, computed as mean square values of quantized latents) are concentrated in a small subset of output latent channels. This is especially true for MLL-based architectures. Table 5 shows one example of collected data, where a Neural Network was trained on nature images or screen images such that it matches the test images. The term q1 denotes a low bitrate case that has 192 output latent channels, while q7 denotes a high bitrate case with 320 output latent channels. For example, for the MLL network in FIG. 3A, for the q1 case, for natural images, 20 out of 192 channels contain more than 99% of total energies, and for screen content images, 28 out of 192 channels contain most of the latent energies. For the corresponding q7 case, the number is 83 out of 320 channels for nature images and 93 out of 320 channels for screen content images. This data indicates that a NN-based image codec can be adapted to enable complexity scalability and/or quality scalability.

TABLE 5

Number of latent channels containing approx. 99.8% of latent energy

| Network | Natural Images | Screen content Images | Total dataset |
|---|---|---|---|
| MLL network in FIG. 3A, q1 | 20 | 28 | 192 |
| MLL network in FIG. 3A, q7 | 83 | 93 | 320 |
| Reference network in FIG. 1, q1 [1] | 80 | 55 | 192 |
| Reference network in FIG. 1, q7 [1] | 189 | 196 | 320 |

Complexity scalability allows a decoder to operate entropy decoding and reconstruction based on available resources, which are limited by the hardware or software capabilities in the device. To support complexity scalability, in one embodiment, one can reorder the latent channels based on their energy concentrations. For example, in an embodiment, the most dominant latent channels may be stored in a base layer, followed by refinement layers for the less dominant latent channels, in a progressive manner which can reduce decoding complexity. The reordering can be pre-defined, so no overhead is needed to be sent to the decoder. As an example, using 192 channels, one may number the channels as 0, 1, . . . , 191. Then one may explicitly specify the coded channel order, e.g., 0, 3, 20, . . . , and the like. At the decoder, the decoder can just decode the channels based on its available resources. In another embodiment, one can allow to signal the channel orders individually or group the channels to save bitrate overhead.

Quality scalability of latents needs to consider bandwidth adaptation. The bitstreams may be packaged in a way that either a user or the network can drop latent channels based on the bandwidth requirement. To enable this capability, some high-level syntax (HLS) is needed, for example, syntax similar to the one being used in Scalable HEVC for quality scalability (e.g., see Annex F of the HEVC/H.265 specification). To be more specific for a NN codec, in an embodiment, one may first signal how many quality levels the bitstream supports. Then for each Network Abstraction Layer (NAL) unit, only the bitstream related to relative quality level is contained. In another example, one can first reorder the channels, then, using HLS, one can signal how many channels are in each quality level. This allows the user or network to remove non-relevant channels from the bitstream based on bandwidth requirements. It is noted that complexity scalability and quality scalability as discussed herein are not limited to MLL-based architectures, but are appliable to other NN-based codecs as well.

References

Each one of the references listed herein is incorporated by reference in its entirety.

[1] D. Minnen, J. Balle', and G. Toderici. "Joint autoregressive and hierarchical priors for learned image compression." $32^{nd}$ Conf. on Neural Information Processing Systems (NeurIPS 2018), Montreal, Canada, 2018.

[2] J. Balle', D. Minnen, S. Singh, S. J. Hwang, and N. Johnston. "Variational image compression with a scale hyperprior." In International Conference on Learning Representations (ICLR), 2018, also arXiv: 1802.01436v2 (2018).

[3] Z. Cheng, H. Sun, M. Takeuchi, and J. Katto. "Learned image compression with discretized Gaussian mixture likelihoods and attention modules." In Proceedings of the IEEE/CVF Conference on Computer Vision and Pattern Recognition (CVPR)", pages 7939-7948, 2020, also arXiv e-prints (2020): arXiv-2001.01568v3, 30 Mar. 2020.

[4] T-Y Lin, P. Dollar, R. Girshick, K. He, B. Hariharan, and S. Belongie. "Feature pyramid networks for object detection". In Proceedings of the IEEE conference on computer vision and pattern recognition, pages 2117-2125, 2017.

[5] S. Liu, X. Xu, S. Lei, and K. Jou, "Overview of HEVC extensions on screen content coding," APSIPA Transactions on Signal and Information Processing, vol. 4, p. e10, 2015.

[6] G. Lu, W. Ouyang, D. Xu, X. Zhang, C. Cai, and Z. Gao, "DVC: An end-to-end deep video compression framework," in 2019 IEEE/CVF Conference on Computer Vision and Pattern Recognition (CVPR) (pp. 10998-1 1007). IEEE Computer Society, 2019, also arXiv: 1812.00101v3, 7 Apr. 2019.

[7] J. Duda, "Asymmetric numeral systems: entropy coding combining speed of Huffman coding with compression rate of arithmetic coding," arXiv preprint arXiv. 1311.2540v2. 6 Jan. 2014.

[8] M. Zhu, K. Han, C. Yu, and Y. Wang, "Dynamic Feature Pyramid Networks for Object Detection," arXiv preprint arXiv: 2012.00779 (2020).

[9] C. Guo, B. Fan, Q. Zhang, S. Xiang, and C. Pan. "Augfpn: Improving multi-scale feature learning for object detection." In Proceedings of the IEEE/CVF Conference on Computer Vision and Pattern Recognition, pages 12595-12604, 2020.

[10] Y. Han et al., "Dynamic Neural Networks: a survey", arXiv preprint arXiv: 2102.04906 (2021).

[11] Tensorflow compression toolbox https://github.com/tensorflow/compression

Example Computer System Implementation

Embodiments of the present invention may be implemented with a computer system, systems configured in electronic circuitry and components, an integrated circuit (IC) device such as a microcontroller, a field programmable gate array (FPGA), or another configurable or programmable logic device (PLD), a discrete time or digital signal processor (DSP), an application specific IC (ASIC), and/or apparatus that includes one or more of such systems, devices or components. The computer and/or IC may perform, control, or execute instructions relating to multi-level latent fusion in neural networks for image and video coding, such as those described herein. The computer and/or IC may compute any of a variety of parameters or values that relate to multi-level latent fusion in neural networks for image and video coding described herein. The image and video embodiments may be implemented in hardware, software, firmware and various combinations thereof.

Certain implementations of the invention comprise computer processors which execute software instructions which cause the processors to perform a method of the invention. For example, one or more processors in a display, an encoder, a set top box, a transcoder, or the like may implement methods related to multi-level latent fusion in neural networks for image and video coding as described above by executing software instructions in a program memory accessible to the processors. Embodiments of the invention may also be provided in the form of a program product. The program product may comprise any non-transitory and tangible medium which carries a set of computer-readable signals comprising instructions which, when executed by a data processor, cause the data processor to execute a method of the invention. Program products according to the invention may be in any of a wide variety of non-transitory and tangible forms. The program product may comprise, for example, physical media such as magnetic data storage media including floppy diskettes, hard disk drives, optical data storage media including CD ROMs, DVDs, electronic data storage media including ROMs, flash RAM, or the like. The computer-readable signals on the program product may optionally be compressed or encrypted.

Where a component (e.g. a software module, processor, assembly, device, circuit, etc.) is referred to above, unless otherwise indicated, reference to that component (including a reference to a "means") should be interpreted as including as equivalents of that component any component which performs the function of the described component (e.g., that is functionally equivalent), including components which are not structurally equivalent to the disclosed structure which performs the function in the illustrated example embodiments of the invention.

Equivalents, Extensions, Alternatives and Miscellaneous

Example embodiments that relate to multi-level latent fusion in neural networks for image and video coding are thus described. In the foregoing specification, embodiments of the present invention have been described with reference to numerous specific details that may vary from implementation to implementation. Thus, the sole and exclusive indicator of what is the invention, and what is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A method to compress and decompress an image using a neural network for generating and processing latent features, the method comprising:

receiving an input image at an input spatial resolution to be compressed using latent features;

processing the input image using a plurality of consecutive levels of convolution networks to generate a fused output of latents, wherein for each network level of the plurality of convolution networks its output has a lower spatial resolution than its input;

quantizing the fused output of latents to generate quantized fused latents; and applying arithmetic encoding to the quantized fused latents to generate coded fused latents, wherein generating the fused output of latents further comprises:

selecting latent outputs from two or more convolution networks among the plurality of consecutive levels of convolution networks; and fusing the selected latent outputs to generate the fused output of latents, wherein the fused output of latents has a same dimensionality as one of the selected latent outputs.

2. The method of claim 1, further comprising:

receiving the coded fused latents;

decoding the coded fused latents to generate decoded fused latents; and processing the decoded fused latents using a plurality of consecutive levels of deconvolution networks to generate an approximation of the input image at the input spatial resolution, wherein for each network level of the plurality of deconvolution networks, its output has a higher spatial resolution than its input.

3. The method of claim 1, wherein given a selected level L1 of latents with an L1 output and a selected level L2 of latents, with an L2 output, wherein the level L2 is subsequent to the level L1, fusing the selected latent outputs further comprises:

generating an up-scaled level L2 output by upscaling the L2 output to match the spatial resolution of the L1 output; and generating the fused output of latents based on the up-scaled L2 output and the L1 output.

4. The method of claim 3, wherein generating the fused output of latents further comprises:

processing the L1 output with an 1×1 convolution network and adding the output of the 1×1 convolution network to the up-scaled L2 output to generate the fused output of latents.

5. The method of claim 3, wherein generating the fused output of latents further comprises:

processing the L1 output with a k×k convolution network and adding the output of the k×k convolution network to the up-scaled L2 output to generate the fused output of latents, wherein k≥1 is an odd integer selected based on one or more characteristics of the input image.

6. The method of claim 5, wherein characteristics of the input image comprise one or more of: a natural image, a screen content image, an HDR image, a virtual reality image, a computer generated image, or any abstract feature maps extracted from an image.

7. The method of claim 3, wherein generating the fused output latents further comprises:

processing the L1 output with two or more separate convolution networks and combining the outputs of the two or more separate convolution networks with the up-scaled L2 output to generate the fused output latents.

8. The method of claim 3, further comprising:

concatenating the up-scaled L2 output and the L1 output using a concatenation network;

generating a weighted map for each latent feature to be merged; and applying the weighted map to the output of the concatenation network to generate the fused output latents.

9. The method according to claim 1, wherein selecting the latent outputs from two or more convolution networks comprises selecting the latent outputs from two or more convolution networks among a subset of the plurality of consecutive levels of convolution networks.

10. A method to compress and decompress an image using a neural network for generating and processing latent features, the method comprising:

receiving an input image at an input spatial resolution to be compressed using latent features;

processing the input image using a plurality of consecutive levels of convolution networks to generate one or more fused output of latents, wherein for each level network of the plurality of convolution networks, its output has a lower spatial resolution than its input;

selecting a level L1 of latents with an L1 output and a level L2 of latents, with an L2 output, wherein the level L2 is subsequent of the level L1;

generating an up-scaled level L2 output by upscaling the L2 output to match the spatial resolution of the L1 output;

combining the up-scaled L2 output and the L1 output to generate a fused L1 output having a same dimensionality as the L1 output;

quantizing and coding the fused L1 output to generate a fused coded L1 output; and quantizing and coding the L2 output to generate a coded L2 output.

11. The method of claim 10, further comprising:

receiving and decoding the coded L2 output and the fused coded L1 output to generate a decoded L2 input and a decoded fused L1 input;

extracting based on the decoded L2 input and the decoded fused L1 input an unfused L1 input; and applying the unfused L1 input to one or more subsequent deconvolution networks to generate an approximation of the input image at the input spatial resolution, wherein for each network level of the one or more deconvolution networks, its output has a higher spatial resolution than its input.

12. The method of claim 3, wherein selecting the L1 level of latents and the L2 level of latents is done dynamically based on optimizing one or more coding parameters.

13. The method of claim 12, where the one or more coding parameters include one or more of: a target coding bit rate, rate distortion optimization, decoder complexity, or image/video characteristics.

14. The method of claim 12, further comprising generating metadata related to fusing selected levels of latents, wherein the metadata comprise one or more of:

a first flag indicating whether adaptive fusion of levels is enabled or not;

patch width and patch height values in luma samples being used for the selected levels;

an index parameter indicating a fusion format selected among a plurality of fusion formats;

a first variable indicating a total number of fused levels used in the selected fusion format; and one or more syntax elements indicating whether fusion is enabled for inter-coding, intra-coding, or motion-vector coding.

15. A method to compress and decompress an image using a neural network for generating and processing latent features, the method comprising:

receiving an input image at an input spatial resolution to be compressed using latent features;

processing the input image using a plurality of consecutive levels of convolution networks to generate one or more outputs of latents, wherein for each level network of the plurality of convolution networks, its output has a lower spatial resolution than its input;

selecting a level L1 of latents with an L1 output and a level L2 of latents, with an L2 output, wherein the level L2 is subsequent of the level L1;

generating a quantized L2 output based on the level L2 output;

generating a predicted level L1 output based on a prediction neural network and the quantized L2 output;

subtracting the predicted L1 output from the L1 output to generate residual L1 latents;

quantizing and coding the residual L1 latents to generate a coded residual L1 output; and coding the quantized L2 output to generate a coded L2 output.

16. The method of claim 15, wherein the prediction neural network comprises a spatial upscaler and two layers of deconvolution networks.

17. The method of claim 15, further comprising:

receiving and decoding the coded L2 output to generate a decoded L2 output;

receiving and decoding the coded residual L1 output to generate decoded residual L1 output;

generating a decoder predicted level L1 output based on a decoder prediction neural network and the decoded L2 output;

adding the decoder predicted level L1 output to the decoded residual L1 output to generate a decoded L1 output;

generating a concatenated L1 output based on the decoded L1 output and the decoded L2 output; and applying the concatenated L1 output to one or more subsequent deconvolution networks to generate an approximation of the input image at the input spatial resolution, wherein for each network level of the one or more deconvolution networks, its output has a higher spatial resolution than its input.

18. The method of claim 1, wherein generating the fused output of latents further comprises generating and transmitting latent scalability metadata related to the output latents.

19. The method of claim 18, wherein the latent scalability metadata comprise complexity scalability parameters and/or quality scalability parameters.

20. The method of claim 19 wherein the latent scalability metadata comprise information related to energy content of the quantized latents.

21. The method of claim 20, wherein under quality scalability, latent channels are transmitted according to their energy level, from higher energy to lower energy.

22. The method of claim 2, further comprising receiving latent scalability metadata for the coded fused latents and decoding of the coded fused latents is performed based on the latent scalability metadata and a scalability criterion.

23. The method of claim 22, wherein the scalability criterion comprises a complexity scalability and channels of coded fused latents are decoded according to their energy level, from higher energy to lower energy.

24. A non-transitory computer-readable storage medium having stored thereon computer-executable instructions for executing with one or more processors a method in accordance with claim 1.

25. An apparatus comprising a processor and configured to perform the method recited in claim 1.

* * * * *